United States Patent [19]
Lempel

[11] Patent Number: 6,067,321
[45] Date of Patent: May 23, 2000

[54] METHOD AND APPARATUS FOR TWO-ROW MACROBLOCK DECODING TO IMPROVE CACHING EFFICIENCY

[75] Inventor: Mody Lempel, Sunnyvale, Calif.

[73] Assignee: LSI Logic Corporation, Milpitas, Calif.

[21] Appl. No.: 08/833,144

[22] Filed: Apr. 3, 1997

[51] Int. Cl.$^7$ ................................................... H04N 7/12
[52] U.S. Cl. ........................... 375/240; 348/409; 348/420
[58] Field of Search .................................. 348/390, 400, 348/405, 409–413, 415, 416, 420, 423, 714, 718; 382/232–233, 236, 238; 711/129; H04W 7/30; H04N 7/12

[56] References Cited

U.S. PATENT DOCUMENTS

| | | |
|---|---|---|
| 5,148,272 | 9/1992 | Acampora et al. ..................... 348/390 |
| 5,231,484 | 7/1993 | Gonzales et al. ....................... 348/405 |
| 5,473,380 | 12/1995 | Tahara ..................................... 348/423 |
| 5,696,698 | 12/1997 | Herluison et al. ...................... 711/129 |
| 5,715,175 | 2/1998 | Herluison ................................ 382/232 |
| 5,815,206 | 9/1998 | Malladi et al. ......................... 348/390 |
| 5,815,604 | 9/1998 | Simons et al. .......................... 348/400 |
| 5,926,222 | 7/1999 | Nickerson ............................... 348/405 |

OTHER PUBLICATIONS

Moving Picture Experts Group (MPEG-2 FAQ), 14 pages.

*Primary Examiner*—Richard Lee

[57] ABSTRACT

Method and apparatus for two row macroblock decoding improves caching efficiency reducing memory bandwidth requirements while simultaneously enabling encoded video information to be decoded in a fast and efficient manner to produce specific results required for MPEG2 video decoding.

10 Claims, 4 Drawing Sheets

6,067,321

METHOD AND APPARATUS FOR TWO-ROW MACROBLOCK DECODING TO IMPROVE CACHING EFFICIENCY

FIELD OF INVENTION

The present invention relates to methods and systems for decoding compressed video information. More particularly, the present invention relates to a two row macroblock decoding method and apparatus for MPEG2 encoded video information to facilitate improved caching efficiency.

BACKGROUND ART

Due to the enormous amounts of information that are transmitted or broadcast on today's telecommunication channels, most if not all such broadcast information is compressed due to the high level of information redundancy in video information. In this regard, there have been many different types and kinds of video information encoding schemes developed. Because of such diversity, the telecommunication industry in general has adopted standards that promote open and interoperable systems.

The most accepted standard proposed by the International Organization for Standardization (ISO) and the International Telecommunication Union-Telecommunication Standardization Sector (ITU-T) was promoted by the Moving Picture Expert Group (MPEG) and recently introduced as the 13818-2 specification for the coded representation of picture information. Final approval of the ISO/IEC 13818-2 (MPEG-2 Video) was given by the $29^{th}$ meeting of ISO/IEC JTC1/SC29/WG11 (MPEG) held in Singapore in November, 1994. This standard which is known by those skilled in the art as MPEG2 compression of video information employs a variable bit rate method where the data rate is reduced for images with a low information content and increased for images with a higher information content.

While the syntax for coding video information into a single MPEG2 data stream are rigorously defined by the 13818-2 specification, the mechanisms for decoding such a MPEG2 data stream are not. Instead, the 132818-2 specification merely defines the results that must be achieved by such decoding.

Therefore, it would be highly desirable to have a new and improved method for caching encoded video information that reduces memory bandwidth requirements while simultaneously enabling the decoding of the video information in a fast and efficient manner to produce the specific results required by the 13818-2 specification.

DISCLOSURE OF THE INVENTION

Therefore, the principal object of the present invention is to provide a new and improved two row macroblock decoding method and apparatus for caching decoded MPEG2 video information that reduces memory bandwidth requirements while simultaneously enabling the encoded video information to be decoded in a fast and efficient manner to produce the specific results required by the 13818-2 specification.

Briefly, the above and further objects of the present invention are realized by providing a new and improved miacroblock two-row macroblock decoding method and apparatus that facilitate caching without the bandwidth requirement of storing the full information requirement of the entire two rows of macroblock data for decoding purposes. The apparatus includes a macroblock cache memory system that cooperates with a variable length decoder and frame buffer storage system to facilitate macroblock decoding in a wave like manner that maximizes neighborhood relations among successive decoded macroblocks. In this regard the method begins by decoding the left most positioned macroblock in a top row, thence to the left most positioned macroblock in an adjacent bottom row, and thence to the right to decode the next macroblock in the bottom row, and thence up to the top row to decode the miacroblock adjacent to the last decoded macroblock in the bottom row. Once the i-th macroblock of both the top and bottom rows has been decoded, the method proceeds to the macroblock to the right of the last decoded macroblock and from thence either up or down to the next macroblock depending on whether the decoding is proceeding from a bottom or top row.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE EMBODIMENTS OF THE INVENTION

Figure 1:
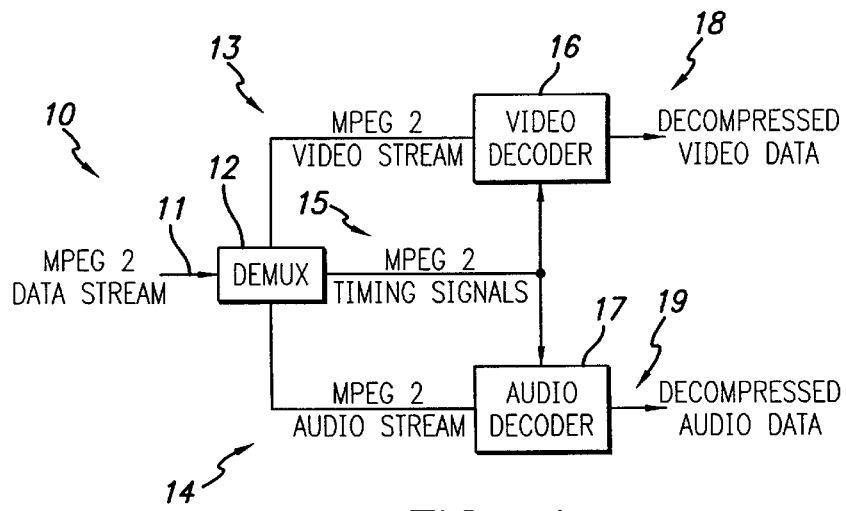
FIG. 1 is a system block diagram of a MPEG2 decoder which is constructed in accordance with the present invention.
Figure 2:
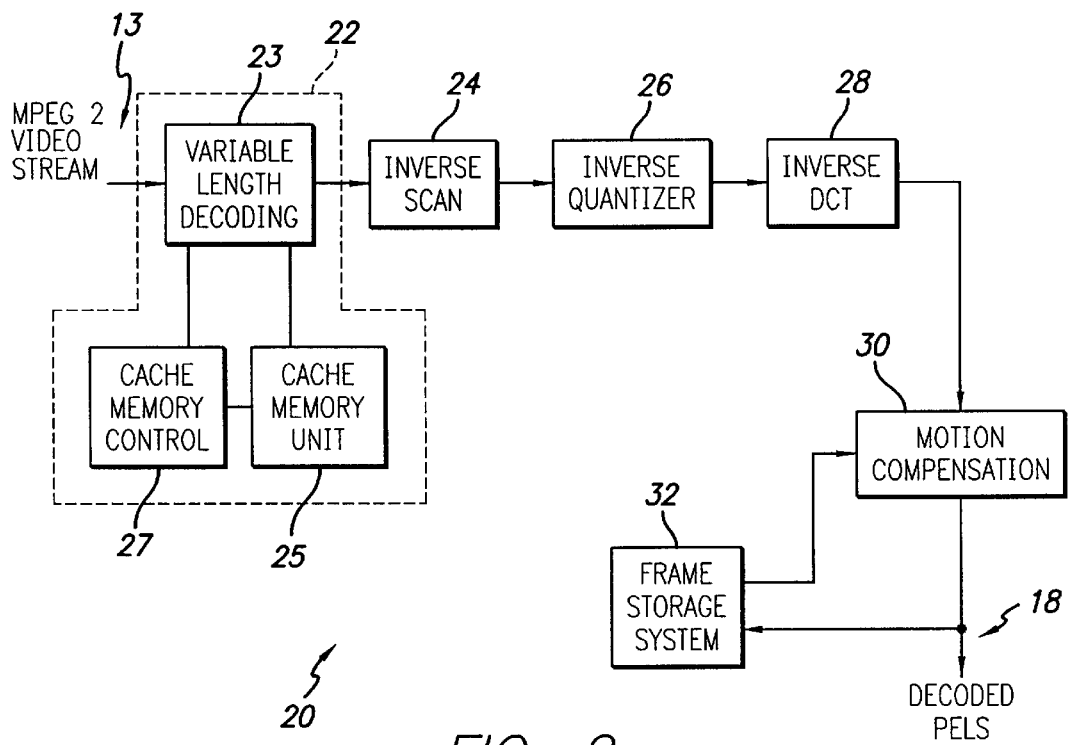
FIG. 2 is a simplified block diagram of the video decoder of FIG. 1.

Referring now to the drawings, and more particularly to FIGS. 1 and 2 thereof, there is shown a decoding system 10 for decompressing a Motion Picture Expert Group (MPEG) data stream 11 into decompressed video data and decompressed audio data which is suitable for driving an audio video device, such as a television receiver (not shown).

The method of decoding the MPEG data stream 11 and more particularly the method of two row macroblock decoding in a non-raster scan order enables the efficient caching of two macroblocks as opposed to the caching of a full row of inacroblocks. In short, the new and improved two row decoding system maximizes neighborhood relations among successive decoded macroblock without the costs associated with buffering a full row of macroblocks for decoding purposes. In this regard, the method and system 10 enable the MPEG data bitstream to be decoded in such a manner to meet the specific output requirements defined by the International Organization for Standardization (ISO) and the International Electrotechnical Committee (ICE) identified as the 13818-2 standard while reducing the memory bandwidth requirements of the video decoding system.

The decoding system 10 generally includes a system decoder 12 that separates the MPEG data stream 11 into its component bitstream is which include a MPEG2 video bitstream 13, a MPEG2 audio bitstream 14, and a timing signal bitstream 15.

The timing signal bitstream 15 is utilized by both a video decoder 16 that decodes or decompresses the MPEG2 video bitstream 13 into a decompressed video bitstream 18 that is fully compliant with the 13818-2 standard, and an audio decoder 17, that decodes the MPEG2 audio bitstream 14 into a decompressed audio signal 19.

Before discussing the details of the video decoder 16, and the method of decoding the MPEG2 video bitstream 13, it may be helpful to briefly review the MPEG standards.

MPEG video compression relies on a lossy technique due to the high level of information redundancy in the video information. Such a technique is implemented by a series of algorithms which replace the original pixel-related information with more complex mathematical descriptions. MPEG decoding or decompression is a reverse process that decodes the mathematical description back to a close approximation of the original pixel-related information.

The MPEG standard specifies the compression requirements,this decompression results and timing requirements for the synchronization of the video and audio signals. In this regard, the MPEG data bitstream 11 is a two layer data bitstream that generally includes 1) a system layer containing timing and other information needed to demultiplex the video and audio information and to facilitate video and audio synchronization for playback purposes; and 2) a compression layer which includes the video bitstream 13 and the audio bitstream 14.

The MPEG standard also defines a hierarchy of data structures that include a frame, a picture, a video sequence having one or more groups of pictures, a macroblock, a slice, and a block.

A frame contains lines of spatial information of the video bitstream 13, where each line contains samples starting from one time instant and continuing through successive lines to the bottom of the frame. For interlaced video, a frame consists of two fields, a top field and a bottom field where one field commences one field period later than the other field.

A video sequence begins with a sequence header and ends with an end-of-sequence code. A picture is the primary coding limit of a video sequence and includes three rectangular matrices which represent the picture luminance and two chrominance values.

A slice is defined as a series of miacroblocks, where each miacroblock is indicative of four 8 by 8 blocks of Illuminance data and the two corresponding 8 by 8 blocks of chrominance data coming from a 16 by 16 section of the luminance component of the picture. The term inacroblocks is also sometimes used to refer to the pel data and sometimes to the coded representation of the pel valies and other data elements defined in the macroblock header of the syntax defined in the 13818-2 specification. The usage of this term is clear from the context.

In a MPEG2 data bitstream, the macroblocks are gathered in slices. In this regard, a slice can begin at any macroblock in a row of miacroblocks and can end with any macroblock in the same row. A slice however, can not include macroblocks from different rows.

A slice also always begins on a byte boundary with a 32 bit start code, where the start code includes the slice vertical position, which is the row number in macroblock units of the slice. Thus, the first slice with a new vertical position is the beginning of the coding of a new row of macroblocks. As will be explained hereinafter in greater detail, the video decoder generates pointers to the beginning of every macroblock row in the compressed video data bitstream.

A block is an 8-pixel by 8-line set of values of luminance or a chrominance component. In this regard, a luminance block and a chrominance block have different sizes where a luminance block is one quarter the size of a chrominance block in a displayed image.

Because of the high level of redundancy in video data bitstreams, the MPEG standard recognizes such redundancy by eliminating redundant data that appears on more than one frame. In this regard, identical blocks of pixels that are common to two or more successive frames will be replaced by a pointer that references a single copy of the block.

Encoders which implement interframe compression may utilize frame prediction, field prediction and other sophisticated motion detection techniques that describe the path of an object in a video sequence for helping to eliminate redundancies. As will be explained hereinafter in greater detail, the decoder 16 reverses the interframe compression process and produces compliant results.

Considering now the video decoder 16 in greater detail with reference to FIG. 2, the video decoder 16 is embodied on a single integrate circuit substrate (not shown) having a series 20 of decoding modules embedded therein that decompress the video data bitstream 13 into decoded pels of decompressed video data 18.

The series of decoding modules 20 includes a variable length decoding module 22, an inverse scan module 24, an inverse quantization module 26, an inverse discrete cosine transformation (DCT) module 28 and a motion compensation module 30 which is coupled to a frame storage system 32.

Considering now the variable length decoding module 22 in greater detail, the variable length decoding module 22 is coupled to an off chip buffering system (not shown) which temporarily stores the compressed video stream 13 for decompression purposes. The off chip buffering system has sufficient storage capacity to store a full frame of macroblocks as well as pointers to the beginning of rows.

The variable length decoding module 22 is responsible for retrieving the stored compressed video stream information 13 and for determining what type of data has been received. The variable length decoding module 22 is also responsible for storing the decoded data in appropriate internal buffer units as well as the frame storage system 32.

The variable length decoding module 22 also searches the compressed video data 13 for slice start codes and temporarily stores such start codes for the decoding process that will be described hereinafter in greater detail. In this regard, the variable length decoding module 22 includes decoding hardware 23 to implement the decoding processes and is the only module in the series 20 of modules that needs to know the value of the line pointers for decompression purposes.

Although in the preferred embodiment of the present invention the variable length decoding module 22 includes decoding hardware 23, those skilled in the art will understand that a combination of hardware and firmware, or firmware alone may be utilized to implement the decoding process.

In order for the variable length decoding indole 22 to implement the decoding method of the present invention, the variable length decoding module 22 includes a cache memory unit 25 which operates under the control of a cache memory control unit 27 which also forms part of the variable length decoding module 22. Tile cache memory unit 25 has a limited storage capacity that is limited to a two macroblock maximum capacity.

In operation, the decoding hardware 23 causes the system to begin at a start step 600 and proceeds to a step 602 that causes the left most macroblock in the first row of video information to be stored in the cache memory unit 25.

The hardware 23 then causes a step 604 to be performed that stores the left most inacroblocks in the next row of video information to be stored. The hardware 23 then advances to a decode step 606 where the macroblock in the top row is decoded.

After decoding the top row macroblock, the hardware 23 proceeds to a step 608 that causes the macroblock in the bottom row to be decoded.

The hardware 23 then goes to a decision step 610 to determine if an end of row has been detected indicating all the miacroblocks in the top and bottom rows have been decoded. If a determination is made that the i-th macroblock in both rows has not been decoded, the hardware 23 proceeds to a decode step 624 to decode the next macroblock in the bottom row. The hardware then proceeds to another decode step 626 to decode the next macroblock in the top row.

The hardware 23 then advances to a decoding step 628 to determine whether all the macroblock in the top row and the bottom row have been decoded.

If all the macroblocks in the top row and bottom row have not been decoded, the hardware 23 returns to the decoding step 606 and proceeds as described previously.

From the foregoing it should be understood that decoding is a repetitive process of top row, top row, bottom row, bottom row and then top row, top row, bottom row, bottom row until all of the macroblocks in the top and bottom rows have been decoded.

If all of the macroblocks in the top and bottom rows have been decoded, the hardware 23 proceeds to a step 612 to find the compressed data for the macroblock to the right of the last macroblock stored.

In a like manner at step 610 if all the miacroblocks in the top and bottom rows have been decoded, the hardware 23 proceeds to the step 612 to find the compressed data for the macroblock to the right of the last miacroblock stored. In this regard if the i-th macroblock in both rows has been decoded the hardware 23 goes to the proceed step 612 to store the macroblock to the right of the last decoded macroblock and from their, the hardware 23 proceeds to a decision step 614 to determine if the last stored macroblock was in a top row or a bottom row.

If it is determined tile last macroblock stored was in a top row, the hardware 23 proceeds to a step 616 to store the next macroblock in the bottom row and then advances to a proceed step 618 to store macroblock in a wave like manner as described previously.

If it is determined the last macroblock stored was not in a top row, the hardware 23 proceeds to a step 620 and then advances to a proceed step 622 to store macroblock in a wave like manner as described previously.

Figure 3:
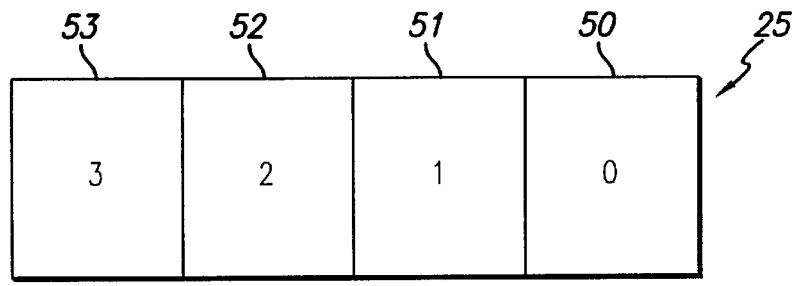
FIG. 3 is a diagrammatic representation of a cache memory unit of the video decoder of FIG. 2.

Considering now the cache memory unit 25 in greater detail with reference to FIG. 3, for cache memory storage purposes, the cache memory un it 25 is subdivided into a set of 4 subblocks 50–53 respectively, where each subblock is defined by a storage capacity of 16 rows by 8 columns of macroblock information. The subblocks 50–53 are respectively numbered 0–3 from right to left for facilitating clarity in explaining the two-row macroblock decoding the method that enables the efficient caching of reference macroblocks. The two row decoding scheme of the present invention also helps in error concealment because of the enhanced neighborhood relations between decoded macroblocks as will be described in greater detail.

TABLE I

| time | subblock 3 | subblock 2 | subblock 1 | subblock 0 |
|------|------------|------------|------------|------------|
| 1    | —          | —          | L1         | R1         |
| 2    | —          | L2         | R2         | R1         |
| 3    | L3         | R3         | R2         | R1         |
| 4    | R4         | R3         | R2         | L4         |
| 5    | R4         | R3         | L5         | R5         |

Referring now to Table I, the method of storing reference macroblock information in the cache memory 25 is illustrated. A macroblock is defined as mentioned previously, as an N by N or 16 row by 16 line block of video information. In this regard, a macroblock can be further defined to include a left subblock portion of n by m 8 rows by 8 columns and a right subblock portion of n by m 8 rows by 16 columns.

In order to accommodate for half pet accuracy overhead, a slightly larger reference macroblock is required and is defined by a 17 by 17 pixel array. However, for symmetry purposes the reference macroblock is redefined to include 18 rows and 18 columns of video information.

Based on the foregoing when half pet accuracy is required, the subblocks are defined as a right subblock portion of 18 rows by 9 columns and a left subblock portion of 18 rows by 9 columns.

Based on the foregoing those skilled in the art will understand that when half pet accuracy is required the macroblock is defined in an 18 by 18 array and when half pel accuracy is not required the miacroblock is defined in a 16 by 16 array. In a similar manner, right and left subblock sizes are also adjusted from 18 rows by 9 columns to the 16 rows by 8 columns.

In the preferred embodiment of the present invention, the larger macroblock structure is preferred as it accommodates the half pel accuracy requirements.

The storage process begins when the variable length decoder 22 causes the first macroblock (MB1) in a first row to be retrieved for decoding purposes. In this regard, the cache memory control unit 27 causing the right half (R1) of the first macroblock (MB1) in the first row of the compressed video stream 13 to be stored in subblock 0 and the left half (L1) of the first macroblock (MB1) in the first row of the compressed video in to be stored in subblock 1.

The information stored in subblock 0 and subblock 1 forms a contiguous 18 by 18 pel area so that a reference macroblock is contiguously stored for the reference of the second macroblock (MB2).

The second macroblock (MB2) is retrieved and the cache memory control unit 27 causes the right half (R2) of the second macroblock (MB2) to be cached in subblock 1 overwriting the left half (L1) of the first macroblock (MB1), and the left half (L2) of the second macroblock (MB2) to be cached in subblock 2. Overwriting the left half (L1) of the first macroblock (MB1) is achieved and has negligible effect on cache hit ratios as there is a very small probability that the left half of MB1 will have any overlap with the reference for the third macroblock (MB3).

It should be noted again, that if subblock 1 and subblock 2 form a contiguous 16 by 16 area then the reference MB is contiguously stored.

The third miacroblock (MB3) is retrieved and the cache memory control unit 27 causes the right half (R3) of the third miacroblock (MB3) to be stored in subblock 2 and the left half (L3) of the third macroblock (MB3) to be stored in subblock 3. Again, this storing method overwrites the left half (L2) of the second macroblock (MB2).

When the variable length decoding unit 22 commences to retrieve the reference macroblock for the fourth macroblock (MB4) the cache memory unit 25 has stored therein the rights halves (R1) and (R2) of the reference macroblocks (MB1) and (MB2) and the full reference macroblock (MB3). The reference for (MB4) is stored in subblocks 3 and 0.

The scheduled process as illustrated in Table I continues in a cyclical manner, with the right half of the next macroblock overwriting the left half of the last macroblock and the left half of the next macroblock Occupying the next subblock location. This cyclical method can be expressed by the following equation:

$$\text{Next underscore subblock}=[(\text{current subblock number}+1) \bmod 4] \quad \text{Equation 1}$$

From the foregoing, it should be understood by those skilled in the art, that every subblocks 50–53 hold a contiguous area of reference data. This implies that the data in subblocks could well overlap and that data needs to be moved from one subblock to another. In short then the storage scheme benefit is that it is very easy for the variable length decoding module 22 to determine if the next reference frame has any part of it in the cache memory unit 25.

The decoding scheme of the variable length decoding module 22 requires that the address of the top left pixel for each subblock be stored so that a simple comparison between the current macroblock and the reference macroblock can be achieved. More particularly, since the variable length decoding module 22 has a cache memory unit 25 that defines the size of the subblock and since the subblock holds a contiguous area, the hardware 23 of the decoding module 22 can easily determine whether the current macroblock is the same as the reference macroblock. In this regard, if there is no equivalency or overlap of data, decoding can accomplished in a fast and efficient manner as will be described hereinafter in greater detail.

Alternatively, if there is an equivalency or an overlapping of data no further decoding is required as the macroblock data will be the same as the reference macroblock which has already been decoded.

The decoding scheme of the present invention then, is equivalent to finding the overlap of two rectangular area by utilizing four simple comparisons that will also be described hereinafter in greater detail. It should be noted however, that the decoding must be done for each of the four subblocks where the overlapping between the subblocks can be taken into consideration.

Figure 4:
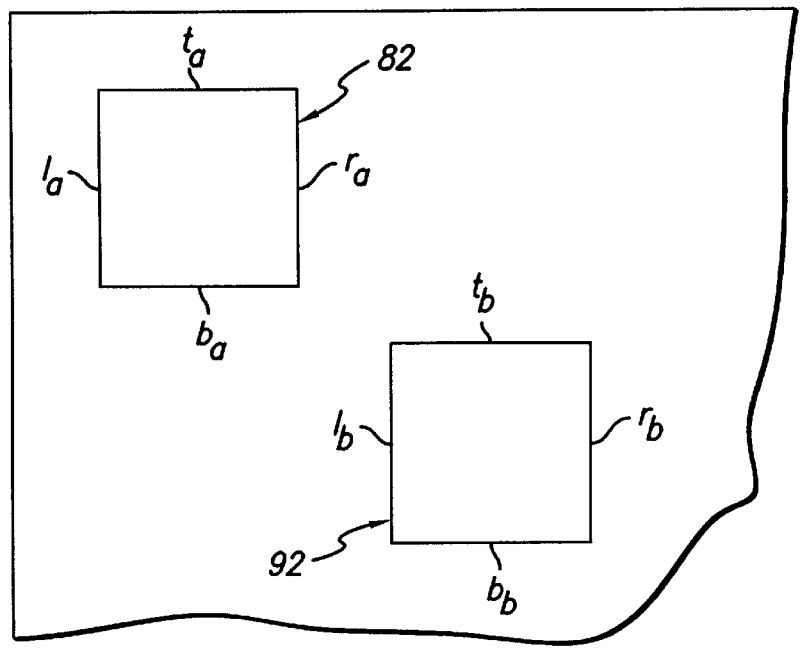
FIG. 4 is a diagrammatic representation of two macroblocks without an overlapping relationship.
Figure 5:
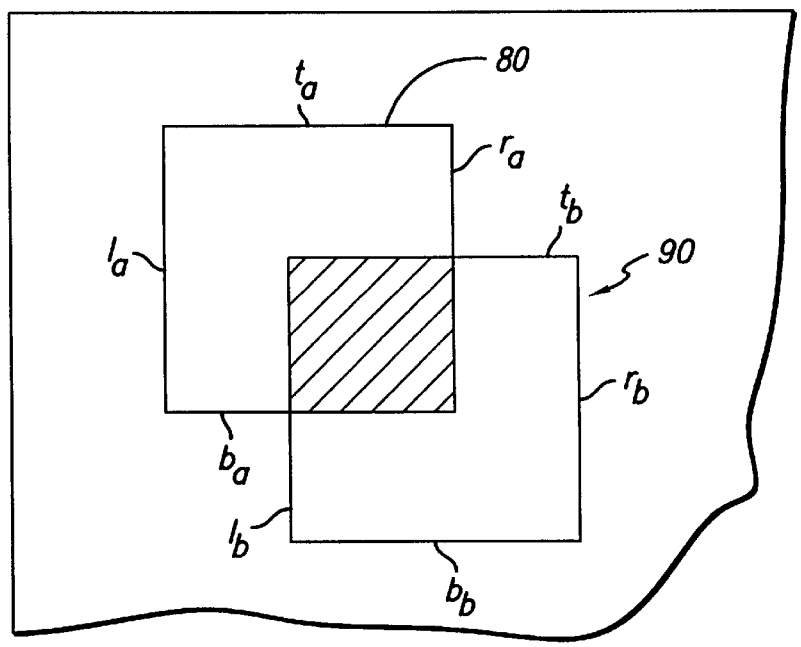
FIG. 5 is a diagrammatic representation of two macroblocks having an overlapping relationship.
Figure 6:
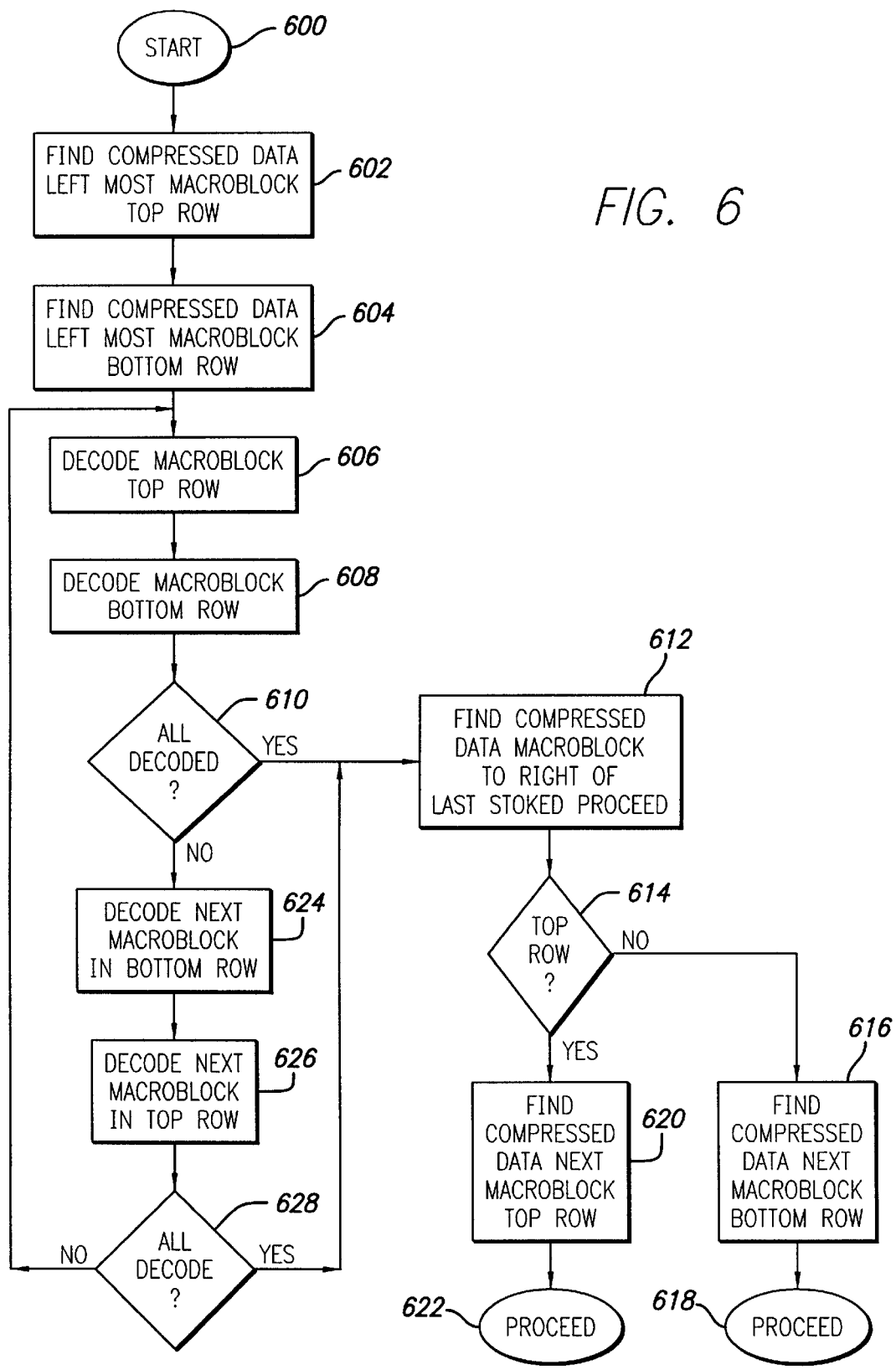
FIG. 6 is flowchart of a caching method which steps are in accordance with the present invention.

Considering now the four comparisons in greater detail to FIGS. 3, 4 and 5, and the following equations:

As best seen in FIG. 5 a reference miacroblock 80 having a top boundary value $t_a$ and a bottom boundary value $b_a$ is illustrated relative to a current macroblock 90 having another top boundary value $t_b$ and another bottom boundary value $b_b$. If there is an equivalency relative to the two macroblock 80 and 90 then an overlap between the areas bounded by the two respective macroblocks 80 and 90 will occur as defined by the following four equations:

$$t_a \text{ is greater than or equal to } b_b \quad \text{Equation 2}$$

$$b_a \text{ is less than or equal to } t_b \quad \text{Equation 3}$$

$$r_a \text{ is greater than or equal to } l_b \quad \text{Equation 4}$$

$$l_a \text{ is less than or equal to } r_b \quad \text{Equation 5}$$

The top boundary values $t_a$ and $t_b$ and the bottom boundary values $b_a$ and $b_b$ as best seen in FIG. 3, are the row coordinate values of the respective top and bottom sides of the macroblock rectangular representations 80 and 90 respectively, where magnitude increases from the bottom to the top. It should be understood by those skilled in the art that in reality, the top rows of the miacroblock representations 80 and 90 will have smaller values than the bottom rows of the representations 80 and 90 since rows are numbered in a frame of video data from the top down.

The right boundary values $r_a$ and $r_b$ and the let boundary values $l_a$ and $l_b$ as best seen in FIGS. 4 and 5 are the column coordinate values of the respective right and left sides of the macroblock rectangular representations 80 and 90 respectively, where magnitude increases from the left to the right.

In order for an overlap to occur between the reference macroblock 80 and the current macroblock 90 all of quantity valies of equations 2–5 must be true. In this regard, if a determination is made that any one of the quantity values of equations 2–5 are not true there is no overlap and this, there is no need to proceed with any further decoding. In short then, decoding times can be substantially reduced under the disclosed decoding scheme of the present invention.

Referring now to FIG. 4, there is illustrated another reference macroblock 82 and another current macroblock 92 that are not arranged in an overlapping manner. In this regard, the following equations can be easily derived:

$$\text{No row intersection } b_a > t_b \text{ and } b_b > t_a \quad \text{Equation 6}$$

$$\text{Row intersection } b_a < t_b \text{ and } t_a > t_b \quad \text{Equation 7}$$

The manner of programming the hardware 23 or the manner of implementing the equations to accomplish the decoding process will not be described hereinafter in greater detail as such programming techniques can be easily implemented by one skilled in the art. It should be noted however, that any such program Should assure that the data structures are addressed in such a manner to simplify the intersection computations and the decision as to what data is cached and what data needs to be retrieved from the main memory storage system 32.

The following will describe in greater detail one scheme for handling intersections and determining what data needs to be stored in the cache memory unit 25.

Considering now the method of handing intersections in greater detail, in order to simplify intersection operations, which includes subblock intersection overlaps, the hardware 23 includes an implemented table, designated as a START-END table. The table is an 18×2 table and includes an entry for every row of a reference macroblock, such as the macroblock 80. In this regard, a row table entry generally includes two parameters: a starting position for the row that needs to be fetched from the main memory unit 32; and an ending position for the row that also needs to be fetched from the main memory unit 32.

Whenever an intersection is determined to exist between a reference macroblock and a current macroblock, such as the macroblocks 80 and 90 respectively, the row table parameters must be updated. In this regard, if part of an intersection was already found in the cache memory unit 25, the start/end position of the intersection will be outside the data area that is still missing. After intersection with two or three of the subblocks is determined, the start and end parameter entries will give the complete range of positions missing from each row.

In the hardware 23 only two parameter are utilized as it would be improbable that a subblock will intersect only the middle of a row. In this regard, in most cases, the intersection will generally be at about a corner area of the reference miacroblock.

The actual firmware implementation is expressed as follows:

Let B be a cached reference miacroblock, such as the miacroblock 80.

Let A be a reference miacroblock, such as the miacroblock 90.

Let $VM_1$ be indicative of the top row of the intersection.

Let $VM_2$ be indicative of the bottom row of the intersection.

The values are determined as follows:

$[t_B$ is less than or equal to $t_A$ is less than or equal to $b_B]$ &&                Equation 8

$[b_B$ is less than or equal to $b_A]$; where $VM1=t_A$ and $VM2=b_B$ $[t_A$ is less than or equal to $t_B$ is less than or equal to $b_A]$ &&                Equation 9

$[b_A$ is less than or equal to $b_B]$; where $VM_1=t_B$ and $VM2=b_A$ $[t_A$ is less than or equal to $t_B$ is less than or equal to $b_A]$ &&                Equation 10

$[b_B$ is less than or equal to $b_A]$; where $VM_1=t_B$ and $VM2=b_B$ $[b_B$ is less than $t_A]$ or $[b_A$ is less than $t_B]$ then no intersection                Equation 11

If there is a potential intersection based on vertical values, the horizontal intersections for row $VM_1$ and $VM_2$ are checked utilizing the following equations:

$l_B$ is less than or equal to $S[i]$ is less than $r_B$; where $S[i]=r_B$                Equation 12

$l_B$ is less than or equal to $E[i]$ is less than $r_B$; where $E[i]=l_B$                Equation 13

If at the end of the firmware process $E[i]$ is less than or equal to $S[i]$ then all of row i is stored in the cache memory unit 25.

Figure 7:
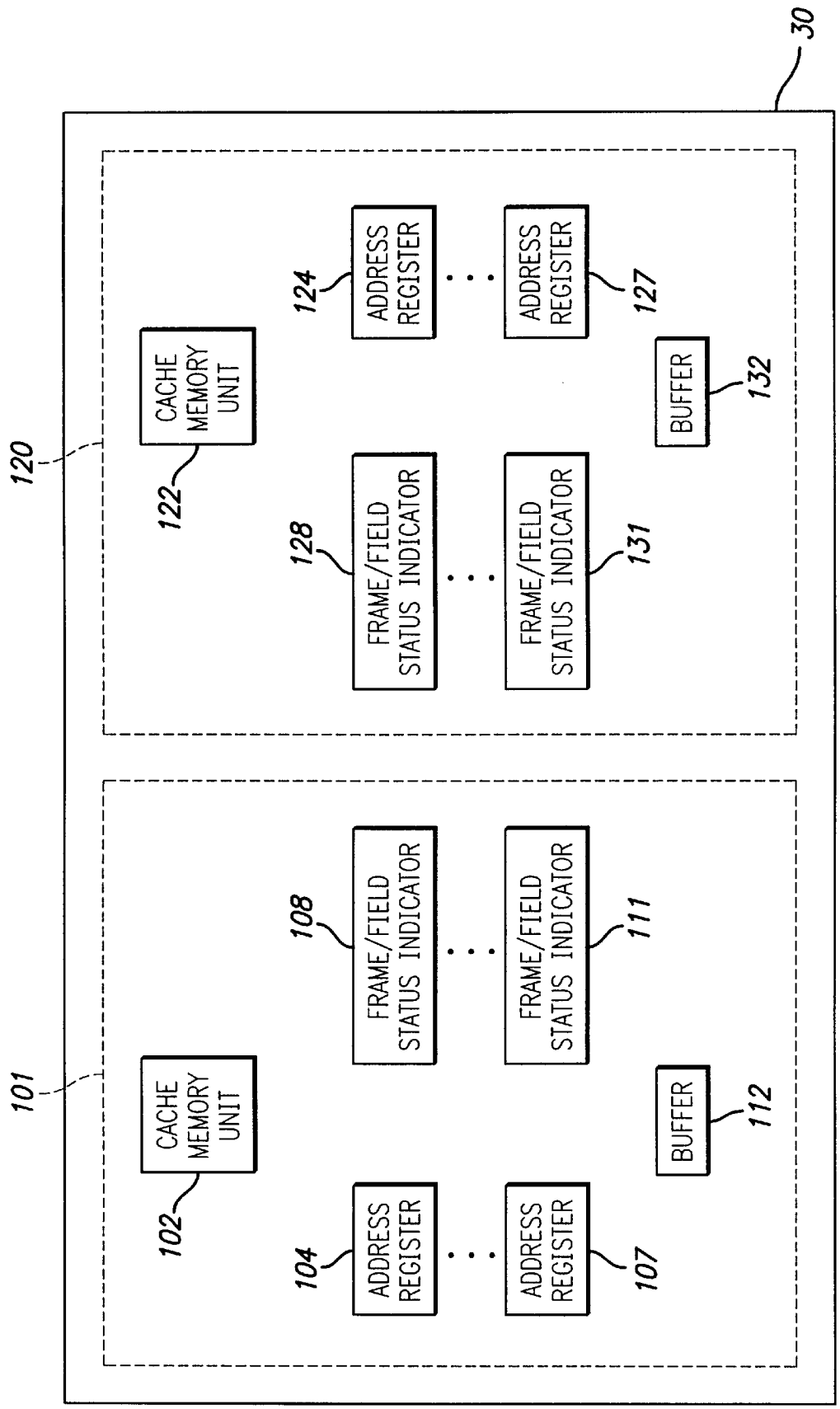
FIG. 7 is a block diagram of the motion compensation unit of the video decoder of FIG. 2.

Considering now motion compensation unit 30 in greater detail with reference to FIG. 7, and the handling of tile different prediction modes in greater detail in view of the above described cache memory decoding scheme, those skilled in tile art will understand that there are five prediction types and two frame types that need prediction. In total then, there are nine different prediction modes. Each of the prediction modes will now be considered in greater detail utilizing the following assumptions:

The motion compensation unit 30 contains a pair of motion prediction arrangements 101 and 120 each having a separate cache memory units 102 and 122 to provide a total of two macroblock cache memory storage capacity as illustrated in FIG. 7.

The cache memory units 102 and 122 store either in a forward and backward reference tandem or a top field and bottom field reference tandem. Each of the cache memory units 102 and 122 respectively include an address register and a frame/field status indicator for each subblock in the cache memory unit, such as registers 104–107 and 124–127 respectively, and indicators 108–111 and 128–131 respectively.

The cache memory units 102 and 122 contain a three 18 rows by a eighteen column inacroblocks storage array as opposed to the previously described full two macroblock scheme described previously. Each macroblock, such as the macroblock 80 is considered as having two fields. In this regard, when frame macroblocks are cached in the respective memory units 102 and 122, the top field occupies the top half of the memory unit and the bottom field occupies the bottom half of the memory unit. In this manner, there is a uniform treatment regardless of what field or frame information is stored in the cache memory unit, such as the memory unit 102.

Considering now field based predictions in greater detail with reference to FIG. 7, the two most recently decoded upper and lower fields are utilized as reference field, where a field prediction can be made from either one of the reference field and where a motion$_{13}$vertical$_{13}$field$_{13}$select bit is indicative of whether a prediction is from the upper or top field reference or the lower or bottom field reference.

Referring now to the MPEG2 standard, which is incorporated herein by reference as though fully set forth, and more specifically to Tables 6–18 and 7–13 therein and Sections 7.6.2 and 7.6.4 therein, the nine modes of predictions will now be discussed.

Frame Prediction for P Frames:

The first mode is a frame prediction mode for P frames. In this mode of prediction, the most recent decoded I or P frame is the forward reference frame and only one cache memory buffer unit is required, such as the cache memory unit 102.

Frame Prediction for B Frames:

The second mode is a frame prediction mode for B frames. In this mode of prediction, the two most recent decoded I or P frames are the forward and backward reference frames and both of the cache memory buffer units 102 and 122 are required.

Frame Prediction for P Frames:

A field prediction mode for P frames is the third prediction mode of operation. In this mode of operation, every macroblock, such as the reference miacroblock 80 has two associated motion vectors. One of the motion vectors is utilized for the top field of the macroblock 80 and the other motion vector is utilized for the bottom field of the macroblock 80.

Both of the cache memory units 102 and 122 are utilized, where one of tile units 102 stores data from the top reference field and the other one of the units 122 stores data from the bottom reference field.

In one embodiment the 16×8 reference data is stored in an 8×16 subblock and each reference row is stored in 2 subblock rows.

In another embodiment only a single cache memory unit is utilized such as the cache memory unit 102. In this embodiment, once the two fields are interleaved to form the full reference macroblock, the macroblocks are cached using tile scheme described previously. Under this method, each cached macroblock has two associated vectors, one vector for the top field of the macroblock and another vector for the bottom field of the macroblock. Each vector also indicates the reference field to which it points.

Field Prediction for B Frames:

The fourth prediction mode is a field prediction mode for B frames. In this mode both of the cache memory units 102 and 122 are utilized, where one of the memory units is for forward prediction, such as the memory unit 102 and the other one of tile memory units is for backward prediction, such as tile memory unit 122.

As every macroblock has four motion vectors, two forward and two backward, each pair is indicative of a top and bottom field prediction. In this regard, once the two fields are interleaved to form a full reference macroblock, such as the macroblock 80, the macroblock is cached using the scherire described previously.

In this mode of prediction it should be noted that each cached macroblock will have two associated vectors, one for its top field and the other for its bottom field, and each vector indicates to which reference field it is directed.

Field Prediction for P Fields:

A field prediction for P fields is tile fifth prediction mode of operation and requires the use of both cache memory units 102 and 122 respectively. Cache memory unit 102 is utilized to store macroblocks from the top field reference and the other cache memory unit 122 is utilized to store macroblocks from the bottom reference field.

Field Prediction for B Fields:

The sixth prediction mode is a field prediction for B fields. Both cache memory units 102 and 122 are utilized as every miacroblock has two motion vectors, a forward motion vector and a backward motion vector. In this regard, the memory unit 102 stores the forward reference and the memory unit 122 stores tile backward reference. Each of the cache memory units 102 and 122 utilize tile associated indicators 108–111 and 128–131 respectively for indicating from which reference field tire vector came, such as a top field reference or a bottom field reference.

16 KB MC:

The seventh prediction mode is utilized for B field only and is a 16×8 MC. In this mode, every macroblock has two forward motion vectors and two backward motion vectors. The first motion vector is for the upper halt of the macroblock and the second motion vector is for the lower half of the miacroblock. Both of the memory cache units 102 and 122 are utilized one for the forward macroblock and the other for the backward macroblock. Each cached macroblock has two associated vectors one for each half. Also indicators are utilized, such as the indicators 108–111 and 128–131 respectively for indicating to which reference field the vector points.

Dual Prime Prediction for P Fields:

The eight prediction mode is utilized for P frames only when there are no B frames between the target P frame and the reference I/P frame. This mode is a dual prime prediction for P fields. In operation, for every macroblock, there is a prediction macroblock form the two fields of the reference frame. In this regard, both of the cache memory units 102 and 122 are utilized one for the same parity field and the other for the opposite parity field.

Dual Prime Prediction for P Fields:

The final and until prediction mode is a dual prime prediction for P frames and is used only for P frames when there are no B frames between the target P frame and the reference I/P frame.

In this mode, for every macroblock this are four predictions. For each of the two frame fields dual prime field prediction is performed, except that the prediction area is a 16×8 area as opposed to a 16×16 area. Thus, the four predictions are the same parity and opposite parity for the top field of the P frame and the same parity and opposite parity for the bottom field of the P frame.

The dual prime prediction for P frames mode of operation utilizes both cache memory units 102 and 122 respectively. Memory unit 102 holds the two predictions from the top reference field and memory unit 122 hold the two predictions from the bottom reference field. The two predictions are stored one in the top half of the macroblock and the other prediction in the bottom half of the macroblock. Each cached macroblock has two associated pointers with both halves.

Considering now the two row decoding scheme in greater detail, in the two row decoding scheme the variable length decoding hardware 23 keep track of the following row context:

1. A pointer in video bitstream 13 points to the last byte read by the variable length decoding unit 22. The variable length decoder unit 22 also keeps tract of the last bit of information that the decoder 22 utilized.
2. A last DC DCT component, as DC components are relatively coded.
3. Motion vector predictors, as miacroblock motion information is relative to the predictions.
4. Quantizer scales, as each slice has its own, but each macroblock can effect a change.
5. A counter holding the number of the next coded macroblock for handling skipped macroblocks within a slice and when the slices do not completely cover the frame.

With reference to handling skipped macroblocks or when slice coverage is incomplete, it will be recognized by those skilled in the art that data must still be properly placed. Such data is pointed to by the prediction motion vector and thus, reference macroblocks are addressed and the caching mechanism described previously may be employed.

While the foregoing descriptions of the embodiments of the invention were directed to MPEG2 video streams, it should be understood by those skilled in the art that while an MPEG2 slice can include macroblocks from only one row, an MPEG1 slice can include all the macroblock for an entire frame. Thus, the present invention will not operate in an MPEG 1 mode utilizing the two-row caching scheme as described previously. However, it is possible to store the last macroblock and then operate in a conventional raster mode with an effective one macroblock cache. In short then, the disclosure of handling different types of prediction modes may be modified for MPEG1 video bitstreams by simple modification and the inclusion of a buffer, such as a buffer 112 or a buffer 132 that keeps tract of the type of video bitstream being decoded so that the handling of the data can be accomplished in the manner indicated when processing MPEG1 information.

Determining whether cached data can be used and moving data between the cache subblocks can be accomplished one time step ahead of the motion compensation operations. In this regard, while motion compensation is being performed on a macroblock $MB_i$, cache operations can be performed for the macroblock $MB_i+1$. In summary, this can be accomplished regardless of which decoding order is utilized.

I claim:

1. A caching method, comprising:

using a cache memory having a two macroblock storage capacity where each macroblock is defined by a n by m pixel array of decompressed video information, said cache memory being arranged for the storage of four subblocks of the macroblocks where each subblock is defined by an n by m pixel array of decompressed video information;

determining the start location of a first row of macroblocks in a compressed video data bitstream;

determining the start location of a second row of macroblocks in said compressed video data bitstream;

storing a right subblock portion of a first macroblock in said first row of macroblocks in a first subblock location of said cache memory;

storing a left subblock portion of said first macroblock in said first row of macroblocks in a second subblock location of said cache memory;

said right subblock portion of said first macroblock and said left subblock portion of said first macroblock in said first row being stored in said cache memory to form a contiguous N by N pel area defining a first row reference macroblock;

storing a right subblock portion of a first macroblock in said second row of macroblocks in said second subblock location of said cache memory overwriting said left subblock portion of the first macroblock in said first row;

storing a left subblock portion of said first macroblock in said second row of macroblocks in a third subblock location of said cache memory;

said right subblock portion of said first macroblock and said left subblock portion of said first macroblock in said second row being stored in said cache memory to form another contiguous N by N pel area defining a second row reference macroblock;

storing a right subblock portion of a second macroblock in said first row of macroblocks in said third subblock location of said cache memory overwriting said left subblock portion of the first macroblock in said second row;

storing a left subblock portion of said second macroblock in said first row of macroblocks in a fourth subblock location of said cache memory;

said right subblock portion of said second macroblock and said left subblock portion of said second macroblock in said first row being stored in said cache memory to form another contiguous N by N pel area defining another first row reference macroblock;

repeating in a cyclical manner the storing of the remaining macroblocks in said first row and said second row with the right half of the next macroblock of the one row overwriting the left half of the macroblock of the other row in the next subblock location and with the left half of the next macroblock overwriting the right half of the macroblock stored in the next subblock location until all of the macroblocks in the first row and in the second row have been stored as a reference macroblock for macroblock decoding purposes.

2. A caching method according to claim 1, wherein N by N is an 18 by 18 pixel array; and
wherein n by m is a 9 by 18 pixel array.

3. A caching method according to claim 1, wherein N by N is a 16 by 16 pixel array; and
wherein n by m is an 8 by 8 pixel array.

4. A caching method according to claim 1, wherein said compressed video data bitstream comprises an MPEG2 video data bitstream.

5. A caching method, comprising the steps of:

providing a cache memory having first and second macroblock storage areas for decoding a first and second macroblock with a first and second portion;

storing in said first macroblock storage area, a first and a second portion of a first macroblock in a top row of a bit-stream of compressed video information, storing in said first macroblock storage area, a first portion of a first macroblock in a bottom row of a bitstream of compressed video information;

storing in said second macroblock storage area, a second portion of a first macroblock in said bottom row of said bit-stream of compressed video information, a first and a second portion of a second macroblock in said top row of said bitstream of compressed video information, and a first portion of a second macroblock in said bottom row; and repeating in a cyclical manner the storing of remaining macroblocks in said top row and said bottom row with the first portion of the next macroblock of the one row overwriting the second portion of the macroblock of the other row in the next subblock location and with the second portion of the next macroblock overwriting the first portion of the macroblock stored in the next subblock location until all of the macroblocks in the top row and in the bottom row have been stored as a reference macroblock for macroblock decoding purposes.

6. A caching method according to claim 5, wherein said compressed video information comprises an MPEG2 video data bitstream.

7. A caching method, comprising:

using a cache memory having a two macroblock storage capacity where each macroblock is defined by a n by m pixel array of decompressed video information, said cache memory being arranged for the storage of four subblocks of the macroblocks where each subblock is defined by an n by m pixel array of decompressed video information;

determining the start location of a first row of macroblocks in a compressed video data bitstream;

determining the start location of a second row of macroblocks in said compressed video data bitstream;

storing a first subblock portion of a first macroblock in said first row of macroblocks in a first subblock location of said cache memory;

storing a second subblock portion of said first macroblock in said first row of macroblocks in a second subblock location of said cache memory;

said first subblock portion of said first macroblock and said second subblock portion of said first macroblock in said first row being stored in said cache memory to form a contiguous N by N pel area defining a first row reference macroblock;

storing a first subblock portion of a first macroblock in said second row of macroblocks in said second subblock location of said cache memory overwriting said second subblock portion of the first macroblock in said first row;

storing a second subblock portion of said first macroblock in said second row of macroblocks in a third subblock location of said cache memory;

said first portion of said first subblock macroblock and said second subblock portion of said first macroblock in said second row being stored in said cache memory to form another contiguous N by N pel area defining a second row reference macroblock;

storing a first subblock portion of a second macroblock in said first row of macroblocks in said third subblock location of said cache memory overwriting said second subblock portion of the first macroblock in said second row;

storing a second subblock portion of said second macroblock in said first row of macroblocks in a fourth subblock location of said cache memory;

said first subblock portion of said second macroblock and said second subblock portion of said second macroblock in said first row being stored in said cache memory to form another contiguous N by N pel area defining another first row reference macroblock;

repeating in a cyclical manner the storing of the remaining macroblocks in said first row and said second row with the first half of the next macroblock of the one row overwriting the second half of the macroblock of the other row in the next subblock location and with the second half of the next macroblock overwriting the first half of the macroblock stored in the next subblock location until all of the macroblocks in the first row and in the second row have been stored as a reference macroblock for macroblock decoding purposes.

8. A caching method according to claim 5, wherein N by N is an 18 by 18 pixel array; and wherein n by m is a 9 by 18 pixel array.

9. A caching method according to claim 5, wherein N by N is an 16 by 16 pixel array; and wherein n by m is a 8 by 8 pixel array.

10. A caching method according to claim 5, wherein said compressed video data bitstream comprises an MPEG2 video data bitstream.

* * * * *